United States Patent
Neubauer et al.

(10) Patent No.: US 8,360,221 B2
(45) Date of Patent: Jan. 29, 2013

(54) SEGMENTED SUPPORT PLATE FOR A LAMELLA, AND LAMELLA HAVING A SEGMENTED SUPPORT PLATE OF SAID TYPE

(75) Inventors: Dirk Neubauer, Hemsbach (DE); Michael Wagner, Bruehl (DE); Harald Otto Merkel, Angelbachtal (DE)

(73) Assignee: BorgWarner Inc., Auburn Hills, MI (US)

( * ) Notice: Subject to any disclaimer, the term of this patent is extended or adjusted under 35 U.S.C. 154(b) by 502 days.

(21) Appl. No.: 12/676,046

(22) PCT Filed: Aug. 18, 2008

(86) PCT No.: PCT/EP2008/006769
§ 371 (c)(1), (2), (4) Date: Mar. 2, 2010

(87) PCT Pub. No.: WO2009/036853
PCT Pub. Date: Mar. 26, 2009

(65) Prior Publication Data
US 2010/0193317 A1    Aug. 5, 2010

(30) Foreign Application Priority Data
Sep. 14, 2007  (DE) .......................... 10 2007 043 999
Nov. 12, 2007  (DE) .......................... 10 2007 053 758

(51) Int. Cl.
*F16D 13/64* (2006.01)
(52) U.S. Cl. ............. 192/107 R; 188/218 XL; 428/66.2
(58) Field of Classification Search .............. 192/107 R; 428/66.2
See application file for complete search history.

(56) References Cited

U.S. PATENT DOCUMENTS
4,449,621 A  *  5/1984  F'Geppert .................. 192/70.13
(Continued)

FOREIGN PATENT DOCUMENTS
DE    10 2007 053 758 1    11/2007
EP          1 650 454 A       4/2006
(Continued)

*Primary Examiner* — Richard M. Lorence
(74) *Attorney, Agent, or Firm* — Warn Partners, P.C.

(57) ABSTRACT

The present invention relates to a segmented support plate (2) for a lamella, which support plate (2) is assembled from at least two segments (14, 16) in the manner of a jigsaw puzzle so as to form a boundary line (22) between the segments (14, 16), wherein the one segment (14) has a projection (28) which is inserted into a recess (32) in the other segment (16) so as to form a boundary line section (36) between the projection (28) and the recess (32), and the projection (28) and the recess (32) are shaped such that the adjacent segments (14, 16) engage behind one another, in relation to the circumferential direction (10, 12) of the support plate (2), in at least one first and one second partial section (64, 66) of the boundary line section (36). According to the invention, the projection (a) of the first partial section (64) onto a radial line (76) in the circumferential direction (12) at least partially intersects the projection (b) of the second partial section (66) onto the radial line (76) in the circumferential direction (12). The present invention also relates to a lamella, in particular a friction lamella for a multiplate clutch, having a segmented support plate (2) of said type.

19 Claims, 2 Drawing Sheets

U.S. PATENT DOCUMENTS

Figure 1:
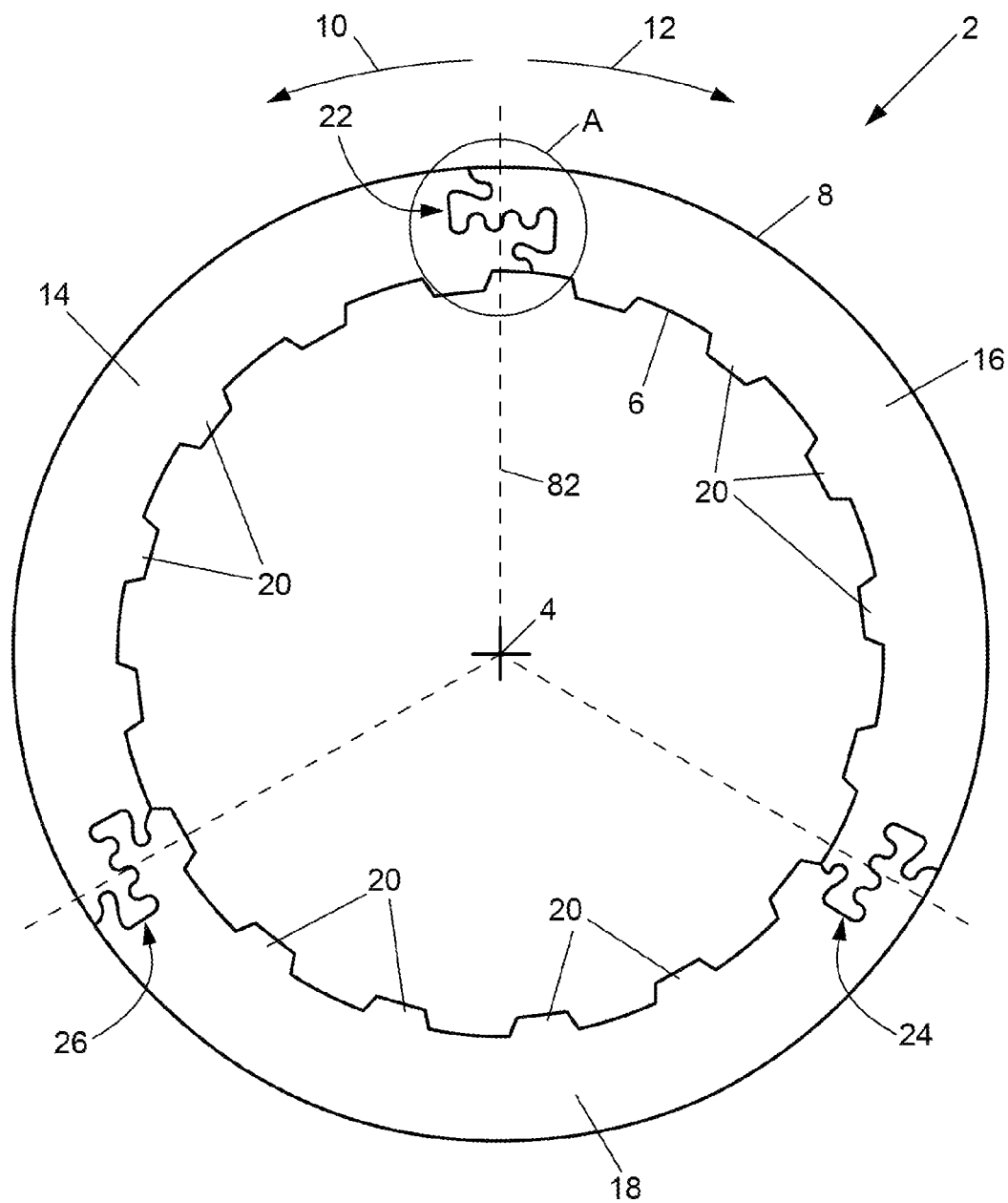

| | | |
|---|---|---|
| 4,674,616 A | 6/1987 | Mannino, Jr. |
| 5,332,075 A | 7/1994 | Quigley et al. |
| 5,713,450 A * | 2/1998 | Quigley .................... 192/107 R |
| 6,170,629 B1 * | 1/2001 | Suzuki et al. .............. 192/107 R |
| 6,585,096 B2 * | 7/2003 | Fujita ........................ 192/85.43 |

FOREIGN PATENT DOCUMENTS

| | | |
|---|---|---|
| GB | 1 347 240 A | 2/1974 |
| WO | WO 2007/097784 A | 8/2007 |
| WO | WO 2009/036853 A1 | 3/2009 |

* cited by examiner

SEGMENTED SUPPORT PLATE FOR A LAMELLA, AND LAMELLA HAVING A SEGMENTED SUPPORT PLATE OF SAID TYPE

This application is a National Stage of International Application No. PCT/EP2008/006769, filed Aug. 18, 2008. This application claims priority to German Patent Application No. 10 2007 043 999.9 filed on Sep. 14, 2007 and German Patent Application No. 10 2007 053 758.3 filed on Nov. 12, 2007. The disclosures of the above applications are incorporated herein by reference.

The present invention relates to a segmented support plate for a lamella, such as a friction lamella in a lamella-type clutch, which support plate is assembled from at least two segments in the manner of a jigsaw puzzle so as to form a boundary line between the segments, one segment having a protrusion, which is inserted into a recess in the other segment so as to form a boundary line section between the protrusion and the recess, and the protrusion and the recess being shaped in such a way that the adjacent segments engage behind one another, in relation to the circumferential direction of the support plate, in at least one first and one second partial section of the boundary line section. The present invention furthermore relates to a lamella with a segmented support plate of said type.

U.S. Pat. No. 4,674,616, for example, describes a segmented support plate for a lamella, which support plate is designed as an annular disk. The support plate in the form of an annular disk is composed of a total of four segments, which are joined together in the manner of a jigsaw puzzle at their ends so as to form a boundary line between the individual adjacent segments. While one segment of the support plate in each case has a protrusion at the end, the adjacent segment has a corresponding recess, into which the protrusion of the other segment is inserted. That section of the boundary line which is formed between the protrusion and the recess is referred to here and below as a boundary line section. The protrusion and the recess are shaped in such a way that the adjacent segments engage behind one another, in relation to the circumferential direction of the support plate, in a partial section of the boundary line section. This design of the protrusion and the recess prevents the assembled segments of the support plate from being pulled apart in a circumferential direction. However, with the known support plates there is the disadvantage that they may burst at particularly high rotational speeds owing to the centrifugal forces resulting therefrom, especially as the geometry of the protrusion and of the recess cannot ensure that the parts are held together reliably in the presence of particularly large centrifugal forces.

In order to solve this problem, EP 1 650 454 A1 proposes a different construction for the segmented support plate. The known support plate is likewise designed as an annular disk and, in a first position, is composed of three segments, which are assembled in the manner of a jigsaw puzzle so as to form a boundary line between the adjacent segments. Here too, one segment has a protrusion, which is inserted into a corresponding recess in the adjacent segment. However, in contrast to the segmented support plate described above, the protrusion and the recess are shaped in such a way that the adjacent segments engage behind one another, in relation to the circumferential direction of the support plate, in a first and a second partial section of the boundary line section, and, here too, the boundary line section describes that section of the boundary line which is formed between the protrusion and the recess. By virtue of the two partial sections of the boundary line section, one segment can be supported more reliably within the recess of the other segment. However, the known segmented support plate may burst in the region of the joints between the segments if particularly high rotational speeds and hence particularly large centrifugal forces act on the support plate. To counteract this problem, EP 1 650 454 A1 furthermore proposes to fix a further segmented support plate of the type described above laterally on the first segmented support plate as a second layer in an axial direction, the segments of the two support plates being arranged offset relative to one another.

The known segmented support plate described above has proven its worth in practice but has the disadvantage that it can be produced only with a relatively high outlay, especially as two support plates have to be joined together axially in order to ensure the stability of the overall construction at high rotational speeds. Moreover, the friction lamellae assembled from the known segmented support plates are of relatively thick construction, depending on the thickness of the individual support plate, with the result that in total they require a relatively large axial installation space.

Taking the abovementioned prior art as a starting point, it is the object of the present invention to provide a segmented support plate for a lamella which can be produced in a simple manner, has a small overall axial length and can be used even at high rotational speeds and hence large centrifugal forces without the segments of the segmented support plate coming apart, which would lead to the support plate bursting. The present invention is furthermore based on the object of providing a lamella, in particular a friction lamella, for a lamella-type clutch, which has an advantageous segmented support plate of said type.

This object is achieved by the features given in patent claims 1 and 18 respectively. Advantageous embodiments of the invention form the subject matter of the subclaims.

The segmented support plate according to the invention is designed for a lamella, in particular a friction lamella, in a lamella-type clutch. The support plate is assembled from at least two segments in the manner of a jigsaw puzzle so as to form a boundary line between the segments. Thus, one segment has a protrusion, which is inserted into a recess in the other segment so as to form a boundary line section between the protrusion and the recess. Here, the term "boundary line section" is intended to denote that section of the boundary line which is formed between the edge of the protrusion and the edge of the recess. The protrusion and the associated recess are shaped in such a way that the adjacent segments engage behind one another, in relation to the circumferential direction of the support plate, in at least one first and one second partial section of the boundary line section, i.e. the respective partial section of the boundary line section is that section of the boundary line section in which the edge of the protrusion and the edge of the recess engage behind one another. It would also be possible, and preferable, to say that the respective partial section of the boundary line section is that section of the boundary line section in which the mutually associated, facing or adjoining sections of the edges of the protrusion and of the recess engage behind one another. According to the invention, the projection of the first partial section onto a radial line in a circumferential direction and the projection of the second partial section in a circumferential direction onto said radial line overlap at least partially. Here, the projection is in each case effected in a circumferential direction, i.e. like the circumferential direction of the support plate, the direction of projection is curved.

Because the projections of the first and the second partial section in a circumferential direction onto a radial line overlap at least partially, it is possible to achieve a particularly large region of support between the two adjacent segments in a circumferential direction, making it possible reliably to prevent bursting of the support plate in the region of the joints between the segments, even at high rotational speeds and the associated large centrifugal forces. Even in the case of a support plate in the form of an annular disk with a relatively small width in a radial direction, it is possible to achieve a particularly large region of support between the adjacent segments. By virtue of the large region of support, there is no need for a further support plate, which would have to be fixed laterally on the first support plate in an axial direction, such as that described in EP 1 650 454 A1. The invention thus provides a segmented support plate which can be produced in a simple manner, has a small overall axial length and can be used at particularly high rotational speeds without the support plate according to the invention bursting in the region of the joints between the segments owing to the centrifugal forces.

In a preferred embodiment of the segmented support plate according to the invention, the projection of the first partial section onto the radial line in a circumferential direction overlaps completely with the projection of the second partial section onto said radial line in a circumferential direction. It is thus possible, for example, for one projection to lie completely within the other projection.

In a particularly preferred embodiment of the segmented support plate according to the invention, the projection of the first partial section onto the radial line in a circumferential direction is congruent with the projection of the second partial section onto the radial line in a circumferential direction. In this embodiment, the partial sections have thus each assumed their maximum size with respect to their projection, thus ensuring that the adjacent segments are held together in a particularly reliable manner in the circumferential direction.

In an advantageous embodiment of the segmented support plate according to the invention, the adjacent segments engage behind one another, in relation to the circumferential direction of the support plate, in at least one further, third partial section of the boundary line section. By virtue of the further, third partial section of the boundary line section, there is a further improvement in the cohesion of the adjacent segments in a circumferential direction, it likewise being possible for the projection of the third partial section onto the radial line in a circumferential direction to overlap partially or completely with the projections of the first and the second partial section onto the radial line in a circumferential direction. The latter feature is advantageous, for example, if the segmented support plate in the form of an annular disk has only a small width in a radial direction.

In a further advantageous embodiment of the segmented support plate according to the invention, the partial sections are spaced apart. This means that further sections of the boundary line section extend between the partial sections mentioned, and the segments in these intermediate sections do not engage behind one another in relation to the circumferential direction.

In a particularly advantageous embodiment of the segmented support plate according to the invention, each segment has a protrusion and a recess, which are each associated with a respective recess and a respective protrusion in the same adjacent segment. In this way, the end section of each segment serves both as a key and a lock, making it possible to provide particularly reliable cohesion in the region of the joints between the segments.

In a further preferred embodiment of the segmented support plate according to the invention, the two boundary line sections of the same boundary line are of substantially symmetrical design with respect to a point of symmetry. Thus, the first boundary line section is formed between the protrusion of one segment and the recess of the other segment, while the second boundary line section is formed between the recess of one segment and the protrusion of the other segment. Here, the term "substantially" makes clear that the two boundary line sections can in fact be designed to exhibit point symmetry in the assembled condition of the support plate. However, it is likewise possible for the protrusions and the recesses to follow the curvature of the support plate in a circumferential direction completely or partially, with the result that there may be a slight deviation from actual point symmetry.

In a further advantageous embodiment of the segmented support plate according to the invention, the point of symmetry is arranged on the boundary line.

In a further advantageous embodiment of the segmented support plate according to the invention, the two boundary line sections adjoin one another.

In a further, particularly advantageous embodiment of the segmented support plate according to the invention, the two boundary line sections adjoin one another at the point of symmetry.

In a further, particularly preferred embodiment of the segmented support plate according to the invention, the protrusion is that end protrusion of a segment which, in a circumferential direction, is arranged behind a radial line through the point of symmetry, and the recess is that end recess of a segment which, in the same circumferential direction, is arranged in front of the radial line through the point of symmetry.

In order to further simplify the production of the individual segments and also the subsequent assembly of the segmented support plate from the individual segments, all the segments of the support plate have the same shape. The word "shape" is intended, in particular, to refer to the contour of the segments, and any internal or external toothing is preferably likewise included.

In order to achieve particularly reliable cohesion of the segments of the segmented support plate, the adjacent segments in a further preferred embodiment of the segmented support plate according to the invention engage behind one another, in relation to the circumferential direction of the support plate, in at least four mutually spaced partial sections of the boundary line as a whole.

To bring about a further improvement in the cohesion of the segments of the support plate according to the invention in the circumferential direction, the protrusion in a further, particularly preferred embodiment of the segmented support plate according to the invention has a first and a second protrusion section, which extend into a first and a second recess section, respectively, of the associated recess so as to form the first and the second partial section of the boundary line section, the protrusion sections and the recess sections extending either radially inward or radially outward. Thus, for example, the protrusion could be configured in the manner of a comb, the teeth of which engage in a radial direction in the recess sections of the recess, which could likewise be of comb-shaped configuration. Particularly reliable cohesion of the segments is thereby achieved, even when the rotational speeds of the support plate are particularly high.

In a further advantageous embodiment of the segmented support plate according to the invention, the segmented support plate is designed as an annular disk and has an inner edge and an outer edge. It is thus possible for toothing to be provided on the inner or outer edge, for example, to enable the support plate to be connected in a torsionally rigid manner to an outer plate support or an inner plate support of a lamella-type clutch.

To prevent the recess from expanding at particularly high speeds and hence large centrifugal forces, allowing the protrusion to slide out of the recess in a circumferential direction, there is furthermore provision in a further, particularly preferred embodiment of the segmented support plate according to the invention for a supporting protrusion on the outer edge and/or the inner edge of one segment, which protrusion extends in a circumferential direction and on which protrusion the adjacent segment is supported in a radial direction.

According to a further, particularly preferred embodiment of the segmented support plate according to the invention, a pocket is provided on the inner edge and/or the outer edge of the adjacent segment, into which pocket the abovementioned supporting protrusion of one segment extends. In this way, it is possible to provide a circular inner or outer edge without radially projecting supporting protrusions.

The lamella according to the invention, which may be a friction lamella for a friction clutch for example, has a segmented support plate according to the invention of the type described above. This also includes a lamella, such as a steel lamella, which consists exclusively of the segmented support plate.

In a preferred embodiment of the lamella according to the invention, a friction facing is arranged on at least one side, preferably on both sides, of the lamella. In the first-mentioned case, this would then be what is referred to as a single-side lamella. The friction facing may be a paper friction facing, for example. Moreover, the friction facing could likewise be segmented, in which case the joints between the segments of the friction facing are preferably arranged offset with respect to the joints between the segments of the support plate.

Figure 2:
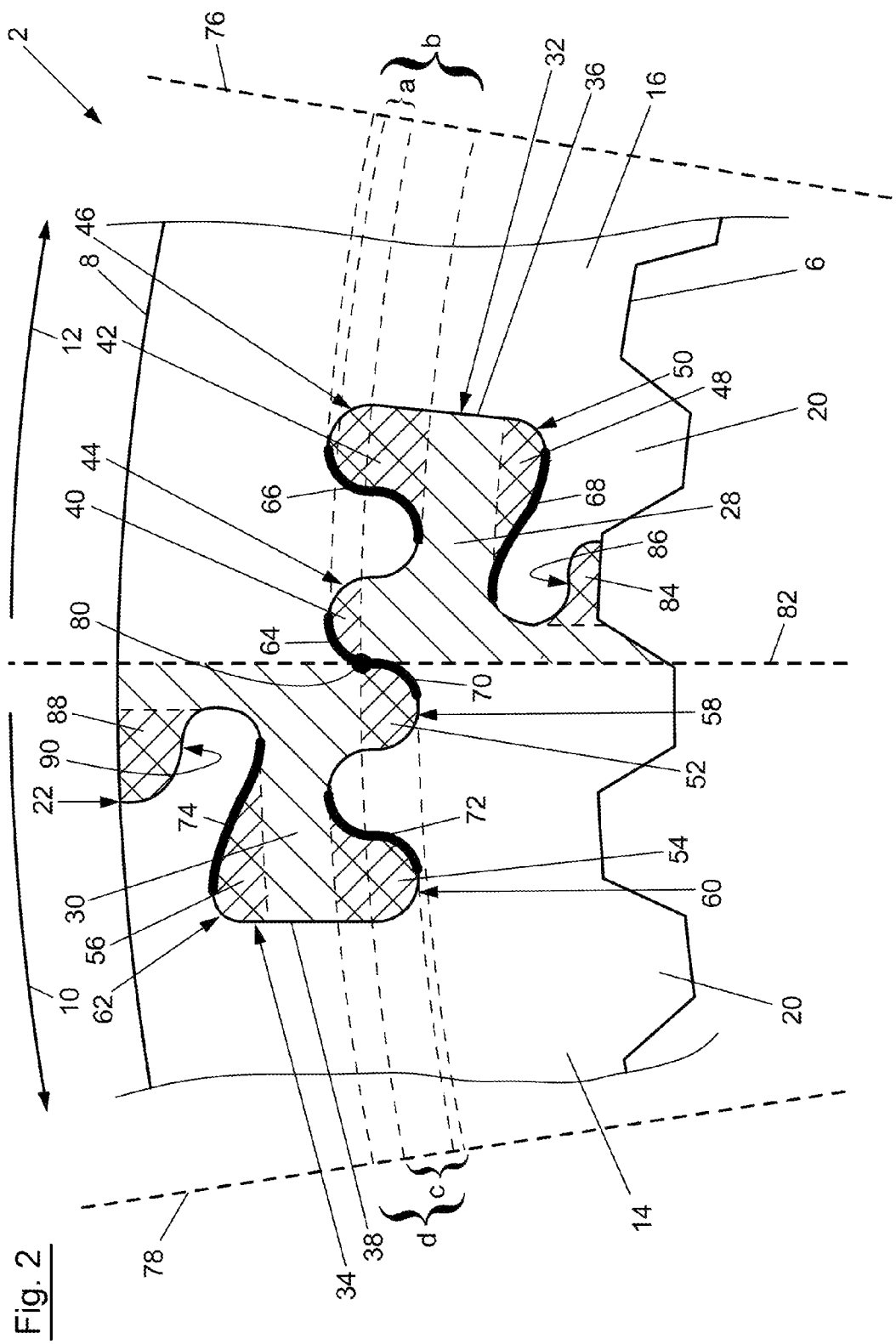

The invention is explained in greater detail below by means of an illustrative embodiment with reference to the attached drawings. In the drawings:

FIG. 1 shows a plan view of one embodiment of the segmented support plate according to the invention, and FIG. 2 shows an enlarged representation of the detail A in FIG. 1.

FIG. 1 shows one embodiment of the segmented support plate 2 according to the invention for a lamella. The lamella may be a lamella for a clutch device, a braking device etc., for example. For this purpose, therefore, it is possible, for example, to fix a friction facing (not shown) on at least one side of the segmented support plate 2 in order to obtain a friction lamella for one of the abovementioned devices. It would also be possible for the lamella to be formed solely by the support plate 2 and to constitute a steel lamella. The segmented support plate 2 is designed as an annular disk and can be rotated within one of the abovementioned devices about an axis 4 of rotation which extends in the direction of the normal to the plane of the drawing in FIG. 1. Here, the segmented support plate 2 has an inner edge 6, which faces the axis 4 of rotation, and an outer edge 8, which faces radially outward. In FIG. 1, the two circumferential directions 10, 12 are indicated by arrows.

In the embodiment illustrated in FIG. 1, the segmented support plate 2 is composed of three segments 14, 16 and 18. All the segments 14, 16, 18 have the same shape or contour, a multiplicity of radially inward-pointing teeth 20 being provided on those lateral edges of the segments 14, 16, 18 which face the axis 4 of rotation and form the inner edge 6 of the support plate 2, these teeth allowing subsequent torsionally rigid engagement with an outer lamella support of a clutch device or similar, for example. The support plate 2 illustrated is thus designed as a support plate for an outer lamella, but the teeth 20 could likewise be provided on the outer edge 8 of the support plate 2, allowing the support plate 2 to form a support plate for an inner lamella.

The segments 14, 16, 18 are joined together in the manner of a jigsaw puzzle at their end sections, which point in a circumferential direction 10 or 12, with the result that a boundary line 22, 24, 26 is formed in each case between the mutually adjacent segments 14, 16; 16, 18; 18, 14. The mutually separated boundary lines 22, 24, 26 each extend radially outward from the inner edge 6 to the outer edge 8 of the segmented support plate 2. The exact construction and shape of the boundary line 22 will be explained in greater detail below with reference to FIG. 2, using said boundary line 22 to represent all the boundary lines 22, 24, 26 between the segments 16, 18, 20.

On their mutually facing end sections, the segments 14, 16 each have a protrusion 28, 30. In FIG. 2, the two protrusions 28, 30 are each provided with simple hatching for the sake of greater clarity. The protrusion 28 of segment 14 is inserted into a recess 32 in the end section of segment 16, the recess 32 having the same shape as the protrusion 28. On the other hand, the protrusion 30 of segment 16 is inserted into a recess 34 in the end section of segment 14, and the recess 34 also has the same shape as the protrusion 30 of segment 16. In this way, the segments 14, 16 are connected to one another in the manner of a jigsaw puzzle in their end sections. A first section of the boundary line 22, which is referred to below as the first boundary line section 36, is formed between the edge of protrusion 28 and the edge of recess 32. In a corresponding manner, a second section of the boundary line 22, which is referred to below as the second boundary line section 38, is formed between the edge of protrusion 30 and the edge of recess 34.

Protrusion 28 has a first protrusion section 40 and a second protrusion section 42, which are each cross-hatched in FIG. 2. The two protrusion sections 40, 42 start from the protrusion 28 and extend radially outward in the direction of the outer edge 8. In doing so, the two protrusion sections 40, 42 each extend into a corresponding recess section 44 and 46, respectively, of recess 32. Also provided on protrusion 28 there is furthermore a third protrusion section 48, which is likewise indicated by cross-hatching. The third protrusion section 48 extends radially inward in the direction of the inner edge 6 of the support plate 2 and occupies a third recess section 50 of recess 32.

In a corresponding manner, the protrusion 30 of segment 16 has cross-hatched protrusion sections, the first protrusion section 52 and the second protrusion section 54 extending radially inward in the direction of the inner edge 6 of the support plate 2, whereas the third protrusion section 56 extends radially outward in the direction of the outer edge 8 of the support plate 2. Once again, the protrusion sections 52, 54, 56 mentioned each extend into corresponding recess sections 58, 60, 62 of the recess 34 in segment 14.

The first protrusion section 40 of protrusion 28 and the first recess section 44 of recess 32 are shaped in such a way that the adjacent segments 14, 16 engage behind one another, in relation to the circumferential direction 10 or 12 of the support plate 2, in a first partial section 64 of boundary line section 36. In a corresponding manner, the second protrusion section 42 of protrusion 28 and the second recess section 46 of recess 32 are shaped in such a way that the adjacent segments 14, 16 engage behind one another, in relation to the circumferential direction 10 or 12 of the support plate 2, in a second partial section 66 of boundary line section 36. Moreover, the third protrusion section 48 of protrusion 28 and the third recess section 50 of recess 32 are shaped in such a way that the adjacent segments 14, 16 furthermore engage behind one another, in relation to the circumferential direction 10 or 12 of the support plate 2, in a third partial section 68 of boundary line section 36.

The protrusion 30 of segment 16 and the associated recess 34 of segment 14 are of substantially the same shape, with the result that a first partial section 70, a second partial section 72 and a third partial section 74 are also formed within the second boundary line section 38, the adjacent segments 14, 16 engaging behind one another in relation to the circumferential direction 10, 12 of the support plate 2 in said partial sections. The partial sections 64, 66, 68, 70, 72, 74 are illustrated with a thicker line in FIG. 2 than the remaining sections of the boundary line sections 36 and 38 in order to allow better discrimination and delimitation. Partial sections 64, 66, 68 are furthermore spaced apart along the first boundary line section 36, while partial sections 70, 72, 74 are spaced apart along the second boundary line section 38.

If the first partial section 64 is projected onto a first radial line 76 of the support plate 2 in a circumferential direction 12, a projection a in the form of a projection line is obtained. If, furthermore, the second partial section 66 is projected onto the first radial line 76 in a circumferential direction 12, a projection b in the form of a projection line is obtained. The first and the second partial section 64, 66 of the first boundary line section 36 are arranged in such a way that the projection a of the first partial section 64 overlaps completely with the projection b of the second partial section 66.

If the first partial section 70 is projected onto a second radial line 78 in a circumferential direction 10, a projection c in the form of a projection line is obtained. If, furthermore, the second partial section 72 is projected onto the second radial line 78 in a circumferential direction 10, a projection d in the form of a further projection line is obtained. Here, the projection c of the first partial section 70 at least partially overlaps the projection d of the second partial section 72.

To generate projections a to d, the direction of projection is curved in accordance with the circumferential directions 12 and 10 respectively. In an alternative embodiment, projections a and b, c and d onto the radial lines 76 and 78 respectively could be made congruent. The special arrangement of the first partial sections 64 and 70 relative to the second partial sections 66 and 72 respectively has the effect that the two segments 14, 16 hold together particularly strongly in the circumferential direction 10, 12, making the support plate 2 particularly suitable for a friction lamella which rotates at high rotational speeds. Bursting of the support plate 2 in the region of the joint between the segments 14, 16 is reliably prevented, and the nested first and second partial sections 64, 70 and 66, 72 respectively can be used to particular advantage when the width of the support plate 2 between the inner edge 6 and the outer edge 8 is particularly small.

The two boundary line sections 36, 38 of the same boundary line 22 are of substantially symmetrical design with respect to a point of symmetry. Here, the term "substantially" makes clear that the two boundary line sections 36, 38 can in fact be designed to exhibit point symmetry in the assembled condition of the support plate 2. However, it is likewise possible for the protrusions 28, 30 and the recesses 32, 34 to follow the curvature of the support plate 2 in the circumferential direction completely or partially, with the result that there may be a slight deviation from actual point symmetry, as shown in FIG. 2. In FIG. 2, the corresponding point of symmetry is provided with the reference 80 and is arranged on the boundary line 22.

The two boundary line sections 36, 38 adjoin one another, the point of symmetry 80 being arranged between the two boundary line sections 36, 38. The two first partial sections 64 and 70 are joined, the point of symmetry 80 being situated between these two partial sections 64, 70. In total, five mutually spaced partial sections 64 and 70, 66, 68, 72, 74 are thus provided along the boundary line 22 as a whole, and in these sections the adjacent segments 14, 16 engage behind one another in relation to the circumferential direction 10, 12 of the support plate 2.

In the above description, the protrusion 28 or 30 is understood to mean that end protrusion of the segment 14 or 16 which, in a circumferential direction 10 or 12, is arranged behind a radial line 82 through the point of symmetry 80, while the recess 34 or 32 is understood to mean that end recess of the segment 14 or 16 which, in the same circumferential direction 12 or 10, is arranged in front of the radial line 82 through the point of symmetry 80.

To prevent the recess 32 in segment 16 from expanding and thus prevent the the protrusion 28 from sliding out of the recess 32 in a circumferential direction 10, protrusion 28 furthermore has a supporting protrusion 84, which is provided with cross-hatching in FIG. 2. The supporting protrusion 84 is provided on the inner edge 6 of the support plate 2 and extends in a circumferential direction 12. In this way, segment 16 is supported in a radially inward direction on the supporting protrusion 84, a pocket 86 being provided in segment 16 in the region of the inner edge 6 of the support plate 2, into which pocket the supporting protrusion 84 can extend in a circumferential direction 12. To achieve the same effect also for the recess 34, the protrusion 30 of segment 16 furthermore has a supporting protrusion 88, which extends in a circumferential direction 10 into a corresponding pocket 90 in segment 14. The supporting protrusion 88 is arranged along the outer edge 8 of the support plate 2. Both pocket 86 and pocket 90 can be designed as part of recess 32 and recess 34 respectively.

LIST OF REFERENCES

2 Segmented support plate
4 Axis of rotation
6 Inner edge
8 Outer edge
10 Circumferential direction
12 Opposite circumferential direction
14 Segment
16 Segment
18 Segment
20 Teeth
22 Boundary line
24 Boundary line
26 Boundary line
28 Protrusion
30 Protrusion
32 Recess
34 Recess
36 First boundary line section
38 Second boundary line section
40 First protrusion section
42 Second protrusion section
44 First recess section
46 Second recess section
48 Third protrusion section
50 Third recess section
52 First protrusion section
54 Second protrusion section
56 Third protrusion section
58 First recess section 60 Second recess section
62 Third recess section
64 First partial section
66 Second partial section
68 Third partial section
70 First partial section
72 Second partial section
74 Third partial section
76 First radial line
78 Second radial line
80 Point of symmetry
82 Radial line through the point of symmetry
84 Supporting protrusion
86 Pocket
88 Supporting protrusion
90 Pocket
a Projection
b Projection
c Projection
d Projection

We claim:

1. A segmented support plate for a lamella, which support plate is assembled from at least two segments in the manner of a jigsaw puzzle so as to form a boundary line between the segments, one segment having a protrusion, which is inserted into a recess in the other segment so as to form a boundary line section between the protrusion and the recess, and the protrusion and the recess being shaped in such a way that the adjacent segments engage behind one another, in relation to the circumferential direction of the support plate, in at least one first and one second partial section of the boundary line section, wherein the projection (a) of the first partial section onto a radial line in a circumferential direction at least partially overlaps with the projection (b) of the second partial section onto the radial line in a circumferential direction.

2. The segmented support plate of claim 1, wherein the projection (a) of the first partial section onto the radial line in a circumferential direction overlaps completely with the projection (b) of the second partial section onto the radial line in a circumferential direction.

3. The segmented support plate of claim 2, wherein the projection (a) of the first partial section onto the radial line in a circumferential direction is congruent with the projection (b) of the second partial section onto the radial line in a circumferential direction.

4. The segmented support plate of claim 1, wherein the adjacent segments engage behind one another, in relation to the circumferential direction of the support plate, in at least one further, third partial section of the boundary line section.

5. The segmented support plate of claim 1, wherein the partial sections are spaced apart.

6. The segmented support plate of claim 1, wherein each segment has a protrusion and a recess, which are each associated with a respective recess and a respective protrusion in the same adjacent segment.

7. The segmented support plate of claim 1, wherein the two boundary line sections of the same boundary line are of substantially symmetrical design with respect to a point of symmetry.

8. The segmented support plate of claim 7, wherein the point of symmetry is arranged on the boundary line.

9. The segmented support plate of claim 7, wherein the two boundary line sections adjoin one another.

10. The segmented support plate of claim 9, wherein the two boundary line sections adjoin one another at the point of symmetry.

11. The segmented support plate of claim 7, wherein the protrusion is that end protrusion of a segment which, in a circumferential direction, is arranged behind a radial line through the point of symmetry, and the recess is that end recess of a segment which, in the same circumferential direction, is arranged in front of the radial line through the point of symmetry.

12. The segmented support plate claim 1, wherein all the segments of the support plate have the same shape.

13. The segmented support plate of claim 1, wherein the adjacent segments engage behind one another, in relation to the circumferential direction of the support plate, in at least four mutually spaced partial sections of the boundary line as a whole.

14. The segmented support plate of claim 1, wherein the protrusion has a first and a second protrusion section, which extend into a first and a second recess section of the associated recess so as to form the first and the second partial section of the boundary line section, the protrusion sections and the recess sections extending either radially inward or radially outward.

15. The segmented support plate of claim 1, wherein the segmented support plate is designed as an annular disk and has an inner and an outer edge.

16. The segmented support plate of claim 15, wherein a supporting protrusion is furthermore provided on the inner edge and/or the outer edge of one segment, which protrusion extends in a circumferential direction and on which protrusion the adjacent segment is supported in a radial direction.

17. The segmented support plate of claim 16, wherein a pocket is provided on the inner edge and/or the outer edge of the adjacent segment, into which pocket the supporting protrusion of said one segment extends.

18. A lamella, in particular a friction lamella, comprising: a segmented support plate assembled from at least two segments in the manner of a jigsaw puzzle so as to form a boundary line between the segments, one segment having a protrusion, which is inserted into a recess in the other segment so as to form a boundary line section between the protrusion and the recess, and the protrusion and the recess being shaped in such a way that the adjacent segments engage behind one another, in relation to the circumferential direction of the support plate, in at least one first and one second partial section of the boundary line section, wherein the projection (a) of the first partial section onto a radial line in a circumferential direction at least partially overlaps with the projection (b) of the second partial section onto the radial line in a circumferential direction.

19. The lamella as claimed in claim 18, wherein a friction facing is arranged on at least one side, preferably on both sides, of the lamella.

* * * * *